United States Patent [19]

Garofalo

[11] 3,936,520

[45] Feb. 3, 1976

[54] PROCESS FOR MANUFACTURING PLASTIC SHUTTERS AND THE LIKE

[75] Inventor: Donald L. Garofalo, St. Paul, Minn.

[73] Assignee: Andersen Corporation, Bayport, Minn.

[22] Filed: Oct. 10, 1974

[21] Appl. No.: 513,575

Related U.S. Application Data

[63] Continuation of Ser. No. 328,067, Jan. 30, 1973, abandoned.

[52] U.S. Cl. .................. 264/90; 156/211; 156/212; 264/249; 264/295; 264/296; 264/322

[51] Int. Cl.[2] .......................................... B29C 17/02

[58] Field of Search ............. 264/92, 249, 275, 295, 264/296, 322, 90; 156/211, 212, 213, 214

[56] References Cited

UNITED STATES PATENTS

| | | | |
|---|---|---|---|
| 1,971,384 | 8/1934 | Ritter | 156/214 |
| 3,702,355 | 11/1972 | Hayden | 264/275 |
| 3,737,498 | 6/1973 | Jackson | 264/92 |

*Primary Examiner*—Robert F. White
*Assistant Examiner*—T. E. Balhoff

[57] ABSTRACT

Plastic shutters and the like are manufactured by attaching a decorative plastic shroud to a supporting frame without substantial use of adhesives by a process in which a generally pan-shaped rectangular shroud is heat formed, the supporting frame is positioned within the plastic shroud, and the sides of the plastic shroud are post-formed to embrace the outer rim of the supporting frame. Since the supporting frame and the plastic shroud are not completely bonded to each other, the shroud and the frame can separately expand or contract without materially warping or distorting the shroud.

3 Claims, 6 Drawing Figures

PROCESS FOR MANUFACTURING PLASTIC SHUTTERS AND THE LIKE

This is a continuation of application Ser. No. 328,067, filed Jan. 30, 1973 now abandoned.

BACKGROUND OF THE INVENTION

Historically, decorative and functional panels have been made from wood. By way of example, wooden shutters of various designs have been used for many years in home construction.

Decorative wooden panels (such as shutters) which are used for exterior purposes (and thus subjected to a wide range of conditions) must be treated for purposes of protecting the wood and to maintain a pleasing decorative appearance.

In recent years, various companies have manufactured plastic shutters as a substitute or alternate for wooden shutters. Properly constructed, plastic shutters have numerous advantages including the general lack of maintainence required. Plastic shutters can be manufactured by a variety of techniques. for example, solid core plastic shutters can simply be molded from suitable plastics. Some plastic shutters, because of their design, can be manufactured with a hollow core defined by rather thin exterior plastic walls. Also, plastic can be used to coat shutter-like wood cores. Other plastic shutters can be made by forming a thin sheet of rigid plastic material into a generally rectangular, pan-shaped shroud which is thereafter attached to a suitable frame (e.g. a wooden or plastic frame) by means of adhesives, fasteners, or the like.

The present invention represents an improvement over the latter type of shutter construction.

In the latter type of shutter construction, it is common to bond the supporting frame to the plastic shroud, usually by means of an adhesive which is used to bond the shroud completely around the outer rim of the supporting frame. Although one might assume that a firm bond between the entire frame and the shroud is desirable, creating a firm bond between the entire frame and shroud actually results in certain disadvantages. One disadvantage of substantially completely bonding the entire supporting frame to the shroud is that the rates of expansion and contraction of the frame and the shroud are not identical. As a consequence, shutters of this type have a tendency to become distorted after a period of time, particularly in the colder climates. This detracts from the appearance of the shutter.

SUMMARY OF THE INVENTION

The present invention is based upon the discovery that improved shutters can be manufactured if the entire frame is not substantially completely bonded to the plastic shroud.

Broadly described, the process of the present invention contemplates mating the plastic shroud and the supporting frame by post-forming a portion of the sides or margin of the plastic shroud to wrap around or embrace the edges or rim of the supporting frame.

The process of the present invention can be utilized without adhesively bonding any portion of the supporting frame to the plastic shroud. However, it is both possible and sometimes desirable to adhesively bond a small segment of the supporting frame (e.g. adhesively bond the cross-brace 14 of the frame as shown in FIG. 3) to the plastic shroud for convenience in manufacturing.

THE DRAWINGS

DETAILED DESCRIPTION

Although the process of the present invention is applicable to the manufacture of plastic panels other than plastic shutters, it is hereinafter described with particular reference to plastic shutters for the sake of illustration and without intending to be limited thereby.

Figure 1:
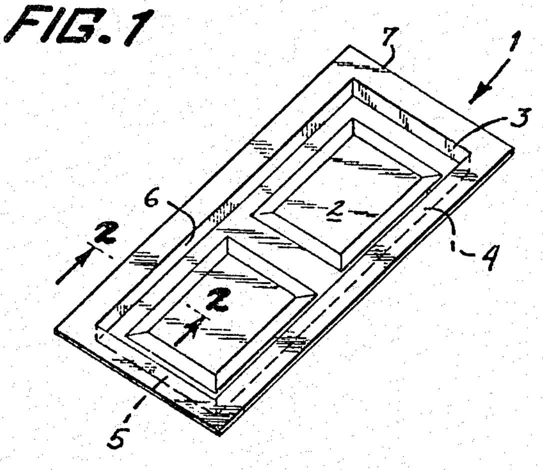
FIG. 1 is a perspective view of an unfinished plastic shroud.

One of the first steps in the manufacture of plastic shutters according to the present invention is to vacuum form a sheet of plastic material (e.g., a thermoplastic such as polyvinyl chloride or the like) in a female mold (not shown) to thereby form a generally rectangular, pan-shaped plastic shroud which is generally designated by the numeral 1 in FIG. 1. As shown in FIG. 1, the plastic shroud has a decorative front face 2 (which faces downwardly and to the right as shown in FIG. 1) and upturned sidewalls 3, 4, 5 and 6. As is generally known in the vacuum forming art, the vacuum forming process creates a generally outwardly extending peripheral lip 7 which is integral with sidewalls 3, 4, 5 and 6. This outwardly extending lip or flange 7 is, for most purposes, considered scrap and is generally removed from the remainder of a molded article after the vacuum forming process has been completed.

Figure 2:
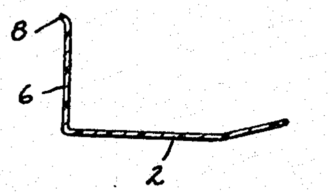
FIG. 2 is a fragmentary cross sectional view of a portion of the plastic shroud of FIG. 1 as taken along the plane 2—2 in the direction of the arrows.

For the present invention, it is necessary to remove at least a portion of this outwardly extending lip 7 from sidewalls 3, 4, 5 and 6. If desired, this removal can be complete, e.g. as by cutting sidewalls 3, 4, 5 and 6 immediately below the protruding lip 7. However, it is preferred for purposes of the present invention that the removal of protruding lip 7 be incomplete so that a small outwardly turned lip 8 as shown in FIG. 2 is retained as a part of each of sidewalls 3, 4, 5 and 6.

The plastics used in the present invention are those plastics which can be shaped or molded with heat (i.e. "thermo-formed") and which can subsequently be further shaped or molded with heat (i.e. post formed). Thermoplastics are preferred although some thermosetting plastics can be used under controlled conditions as is known in the art.

The plastics used to make the shrouds will ordinarily be used in the form of relatively large thin sheets. Although these plastics are "rigid" in the sense that they can be shaped or molded, large sheets of such plastics tend to flex or bend and they need support when they are to be used for functional or decorative purposes. Ordinarily, sheets of plastic used in this invention will have a thickness of less than 3mm (e.g. about 1 mm or less).

Figure 3:
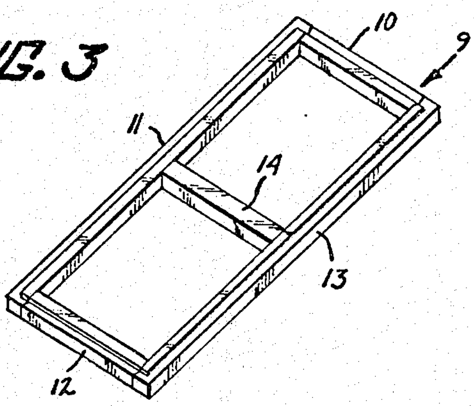
FIG. 3 is a perspective view of a supporting frame.

After the plastic shroud 1 has been formed and the lip 7 trimmed, a supporting frame is positioned within plastic shroud 1. A suitable supporting frame is shown in FIG. 3 and is generally designated by the numeral 9. As shown in FIG. 3, the supporting frame consists of an open, generally rectangularly shaped frame made of elongated strips 10, 11, 12 and 13. The strength of open frame 9 is enhanced by use of brace 14.

Frame 9 can be made of wood or plastic. For many purposes it is convenient to manufacture the frame 9 from wood. Although the cross sectional shape of elongated strips 10, 11, 12 and 13 can vary (e.g. they can be hemispherical), a generally rectangular cross section is preferred (e.g. a square cross section).

Figure 4:
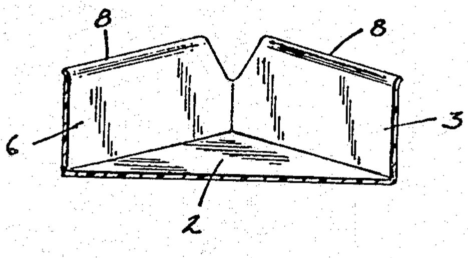
FIG. 4 is a fragmentary view showing how one of the open corners of the plastic shroud can be notched to form foldable marginal tabs on each side wall.

Before or after supporting frame 9 has been positioned within trimmed plastic shroud 1, the four open corners of the plastic shroud are notched as shown in FIG. 4. The purpose of notching the corners is to permit the upper portions of upturned sides 3, 4, 5 and 6 to be used as marginal tabs which can be post-formed around the upper face of frame 9 (e.g. see FIG. 5) to thereby embrace the rim of frame 9. In practice, it has been found most convenient to perform this notching after the supporting frame 9 has been positioned within trimmed plastic shroud 1. The depth and width of the notch should be selected to permit the tab portions of upturned sidewalls 3, 4, 5 and 6 to be post-formed inwardly to closely embrace supporting frame 9. Desirably, the width of the notch will be sufficient so that the marginal tabs do not overlap after they have been post-formed. Still further, it is desirable for the bottom portion of the notch to be slightly rounded to prevent the creation of unnecessary stresses.

Next, the marginal tabs created by notching the four open corners of the shroud 1 are heated and formed around the edges or rim of supporting frame 9 to thereby closely embrace the frame 9.

In practice, it has been found that the post forming of the marginal tabs can be facilitated by heating the upturned sidewalls along a line generally extending parallel to the decorative face 2 of plastic shroud 1 at approximately the base of the corner V-notches. This type of heating can be conveniently accomplished by means of line focus heating elements. After the upturned sidewalls, 3, 4, 5 and 6 have been heated, the marginal tabs are bent inwardly to thereby embrace the supporting frame 9.

Figure 5:
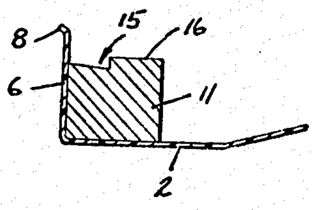
FIG. 5 is a cross sectional view of the plastic shroud of FIG. 2 after first placing the supporting frame shown in FIG. 3 within the plastic shroud.

Improved results can be obtained if a channel 15 (e.g., a kerf, groove, or shoulder) is provided in the upper or back face of frame 9. For example, as shown in FIG. 5, and in FIG. 3, a channel 15 has been cut into the upper or back face 16 of frame 9. This permits the marginal tab portion of the sidewalls (e.g. the tab portion of sidewall 6 as shown in FIG. 5) to be post-formed around the edge of supporting frame 9 (e.g., into kerf 15 of frame element 11 as shown in FIG. 5). Desirably, the channel which is formed in the upper or back face of supporting frame 9 will reduce the thickness of the supporting frame 9 near its outermost edge by an amount at least equal to the thickness of the plastic used to form the shroud. This permits the marginal tab to be bent or post formed into channel 15 without overlying the upper or back face of frame 9. This allows the finished product to be placed against an exterior wall of a home or in another suitable location in such a manner that the supporting frame 9 will make direct contact with the supporting wall. This allows the shutter to be fastened to the wall or a window frame by means of mounting hardware which passes through supporting frame 11. Also, this allows hardware to be screwed to the back face of the supporting frame.

Figure 6:
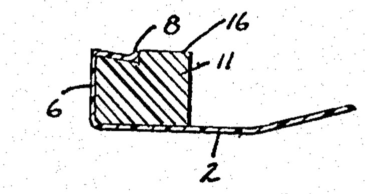
FIG. 6 is a cross sectional view of a finished shutter after the marginal tabs of the plastic shroud have been post formed to embrace the supporting frame.

It has also been found that the effectiveness of the present process can be enhanced by use of a channel having an inclined surface such as that described in FIGS. 5 and 6. This kerf or inclined channel permits the marginal tabs to be post-formed inwardly and downwardly as shown in FIGS. 5 and 6 through an angle of more than 90°. Post forming over an angle of more than 90° is simplified by the small lip 8 which has been retained on the upturned sidewalls. One advantage of this bending of more than 90° is that there is some tendency for the post-formed marginal tabs or flanges to unfold slightly after the post-forming heat and pressure have been released. By initially bending the tabs inwardly and downwardly over more than 90°, they are more likely to retain a permanent bend of at least 90° after the heat and pressure have been removed.

What is claimed is:

1. The process of manufacturing shutters and the like without substantial adhesive bonding which comprises the steps of:

a. forming a relatively thin rigid sheet of plastic material to thereby form a generally rectangular, pan-shaped shroud having a decorative front face and upturned sidewalls, said forming process creating a generally outwardly extending peripheral lip on said sidewalls;

b. removing at least a portion of the outwardly extending lip from the sidewalls;

c. positioning a frame within the shroud with the front face of the frame abutting the shroud and the outer rim of the frame lying adjacent the upturned sides of the shroud, said frame having a channel in its back face with an inclined bottom surface;

d. notching the four open corners of the shroud to thereby create a foldable marginal tab on each of the sidewalls;

e. heating the upturned sidewalls along a line generally parallel to the decorative front face of the plastic shroud;

f. post-forming the heated upturned sidewalls to embrace the outer rim of the frame without use of vacuum means, by the steps of:

i. applying mechanical force to the marginal tab to bend it along the heated line;

ii. positioning the mechanical force to bend the marginal tab 90° along the heated line and into the frame channel without generally causing the plastic shroud to permanently deform except along the heated line;

iii. applying mechanical force to the sidewall lip to bend the tab beyond 90° along the heated line and adjacent the channel bottom surface to at least partially prevent elastic restoring forces from displacing the tab out of the channel when cooled; and g. cooling the plastic shroud in abutting engagement with the frame to provide a non-adhesive interlock between the frame and the marginal tab which resists deformation due to temperature variations.

2. The process of claim 1 in which the frame is an open wooden frame made of elongated wood strips each having a generally rectangular cross section and in which the sheet of plastic is vacuum formed in a female mold in step a.

3. The process of claim 2 in which the wood strips forming the periphery of the frame are generally square in crosssection and in which the tab-receiving channel has been cut from the corner of the wood strips to remove a portion of the outside verical edge of the strips which is adjacent the line along which the marginal tabs are bent, thereby permitting the marginal tabs to be post-formed into the channel without overlying the back face of the frame.

* * * * *